(12) United States Patent
Kobayashi et al.

(10) Patent No.: US 9,731,680 B2
(45) Date of Patent: Aug. 15, 2017

(54) INFLATOR

(71) Applicant: DAICEL CORPORATION, Osaka-shi, Osaka (JP)

(72) Inventors: Tomoharu Kobayashi, Tatsuno (JP); Masayuki Yamazaki, Tatsuno (JP); Kenji Fukumoto, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 15/123,846

(22) PCT Filed: Apr. 6, 2015

(86) PCT No.: PCT/JP2015/060693
§ 371 (c)(1),
(2) Date: Sep. 6, 2016

(87) PCT Pub. No.: WO2015/163122
PCT Pub. Date: Oct. 29, 2015

(65) Prior Publication Data
US 2017/0015273 A1    Jan. 19, 2017

(30) Foreign Application Priority Data

Apr. 23, 2014 (JP) .................................. 2014-088726

(51) Int. Cl.
*B60R 21/272* (2006.01)
*B60R 21/274* (2011.01)
(Continued)

(52) U.S. Cl.
CPC .......... *B60R 21/272* (2013.01); *B60R 21/268* (2013.01); *B60R 21/274* (2013.01);
(Continued)

(58) Field of Classification Search
CPC ..... B60R 21/26; B60R 21/272; B60R 21/268; B60R 21/274
(Continued)

(56) References Cited

U.S. PATENT DOCUMENTS 5,002,085 A    3/1991    FitzGerald
5,368,329 A    11/1994   Hock
(Continued)

FOREIGN PATENT DOCUMENTS

DE    112006001682 T5    5/2008
JP    10-250525 A    9/1988
(Continued)

*Primary Examiner* — James S Bergin
(74) *Attorney, Agent, or Firm* — Birch, Stewart, Kolasch & Birch, LLP (57) ABSTRACT

The present invention provides an inflator including
a rupturable plate closing between the ignition device chamber having a gas discharge port and the pressurized gas chamber filled with a pressurized gas;
a partition wall provided with a rod axially separating an interior of an ignition device unit housing, corresponding to the ignition device chamber, into two chambers;
a combustion chamber provided on the side of a first end of the ignition device unit housing and provided with an igniter, and a diffuser chamber having the gas discharge port and provided on the side of a second end, which is an opposite end to the first end,
the rupturable plate being circular and having,
a circumferential edge fixing portion and a circular non-fixing portion on an inner portion other than the circumferential edge fixing portion,
a fragile portion formed by not less than three grooves provided on a first surface facing the bottle, the grooves extending from a circumference of the circular non-fixing portion or from positions in the vicinity thereof, as a start point, toward a center of
(Continued)

the circular non-fixing portion such that each of end points of the grooves does not reach the center of the circular non-fixing portion, the rod fixed to the partition wall and extending toward the rupturable plate, and the rod colliding with the rupturable plate due to a gas pressure generated by activation of the igniter, coming into contact with all of the end points in the fragile portion and rupturing the rupturable plate.

7 Claims, 4 Drawing Sheets (51) Int. Cl.
*B60R 21/268* (2011.01)
*B60R 21/261* (2011.01)
*B60R 21/26* (2011.01)

(52) U.S. Cl.
CPC ... *B60R 21/261* (2013.01); *B60R 2021/26029* (2013.01); *B60R 2021/26076* (2013.01)

(58) Field of Classification Search
USPC ......... 280/736, 737, 741, 742; 102/530, 531
See application file for complete search history.

(56) References Cited

U.S. PATENT DOCUMENTS

| | | | |
|---|---|---|---|
| 6,447,008 B1 | 9/2002 | Karlin et al. | |
| 6,676,157 B2* | 1/2004 | Nanbu | B60R 21/268 280/736 |
| 6,755,439 B2 | 6/2004 | Nanbu | |
| 6,857,657 B2* | 2/2005 | Canterberry | B60R 21/272 280/737 |
| 7,059,633 B2* | 6/2006 | Wang | F42B 3/045 222/5 |
| 7,328,914 B2* | 2/2008 | Katsuda | B60R 21/261 280/736 |
| 7,338,073 B2* | 3/2008 | Nakayasu | B60R 21/268 280/737 |
| 8,870,222 B2* | 10/2014 | Kobayashi | B60R 21/272 280/736 |
| 8,960,095 B2* | 2/2015 | Peremarty | B60R 21/274 102/530 |
| 9,481,339 B2* | 11/2016 | Kobayashi | B60R 21/274 |
| 2012/0187667 A1 | 7/2012 | Jung et al. | |
| 2016/0068133 A1 | 3/2016 | Kobayashi et al. | |
| 2016/0207493 A1* | 7/2016 | Kobayashi | B60R 21/274 |
| 2017/0043743 A1* | 2/2017 | Kobayashi | B60R 21/274 |
| 2017/0080894 A1* | 3/2017 | Kobayashi | B60R 21/272 |

FOREIGN PATENT DOCUMENTS

| | | |
|---|---|---|
| JP | 4-211773 A | 8/1992 |
| JP | 7-25309 A | 1/1995 |
| JP | 2001-55112 A | 2/2001 |
| JP | 2009-292238 A | 12/2009 |
| WO | WO 2007/003395 A1 | 1/2007 |
| WO | WO 2014/174955 A1 | 10/2014 |

* cited by examiner

INFLATOR

FIELD OF INVENTION

The present invention relates to an inflator used in an airbag apparatus.

DESCRIPTION OF RELATED ART

In an inflator using a pressurized gas, the pressurized gas is stored inside a bottle closed at an opening with a rupturable plate. At the time of activation, the rupturable plate is fractured and the pressurized gas is discharged to the outside of the bottle.

When such an inflator is incorporated in a restraining device using an airbag, a structure is required such that fragments produced by fracture of the rupturable plate are not discharged outside the inflator, so that the airbag is not damaged by the fragments. For this purpose, a filter is disposed to catch the fragments, or a fragile portion is provided in advance on the rupturable plate to ensure that the rupturable plate is fractured without producing any fragments.

Further, in order to ensure a discharge path for the gas after rupturing the rupturable plate, it is desirable that the ruptured portion is maintained in a sufficiently open state after rupturing.

US-A No. 2012/0187667 discloses a gas generator having a rupturable plate 20 in which fragile portions 22 are formed radially on one surface (see FIG. 1).

DE-T5 No. 112006001682 discloses a rupturable plate 7 (see FIG. 4) in which a cross-like fragile portion is formed on one surface, a rupturable plate 9 (see FIG. 5) in which fragile portions are formed radially as a whole on both surfaces, and a rupturable plate 9 (see FIG. 7) in which fragile portions are formed radially on one surface (however, no fragile portion is formed in the central portion). In the inflator depicted in FIG. 8 and FIG. 9, the rupturable plate 7 (FIG. 4) is fractured only by the pressure at the time of activation of an ignition device.

JP-A No. 2009-292238 discloses a rupturable plate in which scores are formed on both surfaces, and an inflator using the rupturable plate. Where the rupturable plate having such scores is used, the rupturable plate is fractured into large triangular fragments at the time of activation. As a result, the fragments are caught on the way to gas discharge, and are not allowed to exit to the outside of the inflator and to flow into the airbag (in paragraph [0050]).

SUMMARY OF INVENTION

Invention 1 of the present invention provides an inflator, including:
- an ignition device chamber accommodating therein an igniter and having a gas discharge port;
- a pressurized gas chamber filled with a pressurized gas inside a bottle;
- a rupturable plate closing between the ignition device chamber and the pressurized gas chamber;
- a partition wall provided with a rod serving as a fracturing device for the rupturable plate and the partition wall axially separating an interior of an ignition device unit housing, corresponding to the ignition device chamber, into two chambers;
- a combustion chamber provided on the side of a first end of the ignition device unit housing and provided with an electric igniter mounted at an opening of the first end; and
- a diffuser chamber having the gas discharge port and provided on the side of a second end, which is an opposite end to the first end of the ignition device unit housing,
- the rupturable plate being circular and having,
  - a circumferential edge fixing portion that is fixed to either one of the bottle and the ignition device unit housing,
  - a circular non-fixing portion on an inner portion other than the circumferential edge fixing portion,
  - a fragile portion formed by not less than three grooves provided on a first surface facing the bottle, the grooves extending from a circumference of the circular non-fixing portion or from positions in the vicinity thereof, as a start point, toward a center of the circular non-fixing portion such that each of end points of the grooves does not reach the center of the circular non-fixing portion,
  - no fragile portion formed on a second surface on the side of the ignition device unit housing, and
- the rod provided at the partition wall and serving as the fracturing device, the rod being fixed to the partition wall and extending toward the rupturable plate, and the rod coming into contact with all of the end points in the fragile portion and rupturing the rupturable plate when the partition wall upon receipt of a gas pressure generated by activation of the ignition device moves in an axial direction and the rod collides with the rupturable plate.

Invention 2 of the present invention provides an inflator, including:
- an ignition device chamber accommodating therein an igniter and having a gas discharge port;
- a pressurized gas chamber filled with a pressurized gas inside a bottle;
- a rupturable plate closing between the ignition device chamber and the pressurized gas chamber;
- a partition wall provided with a rod serving as a fracturing device for the rupturable plate and the partition wall axially separating an interior of an ignition device unit housing, corresponding to the ignition device chamber, into two chambers;
- a combustion chamber provided on the side of a first end of the ignition device unit housing and provided with an electric igniter mounted at an opening of the first end; and
- a diffuser chamber having the gas discharge port and provided on the side of a second end, which is an opposite end to the first end of the ignition device unit housing,
- the rupturable plate being circular and having,
  - a circumferential edge fixing portion that is fixed to either one of the bottle and the ignition device unit housing,
  - a circular non-fixing portion on an inner portion other than the circumferential edge fixing portion,
  - a fragile portion formed in a polygon in the circular non-fixing portion on a first surface facing the bottle, the fragile portion including,
    - first fragile portions formed by grooves forming a perimeter of the polygon, and
    - second fragile portions formed by grooves that extend from all vertices of the polygon as a start point toward a center of the polygon such that each of end points of the grooves does not reach the center of the polygon, a plurality of substantially triangular shapes formed by the first fragile portions as a base and the second fragile portions as remaining two sides, a depth (h1) of the first fragile portion and a depth (h2) of the second fragile portion satisfying the relationship h1<h2, the second fragile portions having the same length as one other, and the rod coming into contact with all of the end points of the second fragile portions and rupturing the rupturable plate when the partition wall upon receipt of a gas pressure generated by activation of the ignition device moves in an axial direction and the rod collides with the rupturable plate.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 2 shows, in (a), a plan view of the rupturable plate for use in the inflator depicted in FIG. 1 which is taken from the fragile portion side, in (b), a view for explaining a range in which the fragile portion is not formed, and in (c), a side view for explaining the rupturing direction when the rupturable plate depicted in (a) is ruptured;

FIG. 3 shows, in (a), a plan view of another embodiment of the rupturable plate for use in the inflator depicted in FIG. 1 which is taken from the fragile portion side, in (b), a view for explaining a range in which second fragile portions are not formed, and in (c), a side view for explaining the rupturing direction when the rupturable plate depicted in (a) is ruptured; and FIG. 4 shows, in (a), a plan view of the rod used in the inflator depicted in FIG. 1, and, in (b) and (c), a plan view of the rod different in shapes from that depicted in (a).

DETAILED DESCRIPTION OF INVENTION

The present invention provides an inflator using a rupturable plate that opens a closed portion of a pressurized gas-filled space without producing fragments.

When an inflator uses a pressurized gas as a gas source, the interior of a bottle-like housing (serving as a pressurized gas-filled space) is filled with a gas such as argon or helium under a high pressure, and the gas outlet is closed with the rupturable plate.

The inflator of the present invention uses a rupturable plate having a specific fragile portion as the rupturable plate.

The thickness of the rupturable plate used in the inflator is preferably 0.20 mm to 2.0 mm, more preferably 0.20 mm to 1.0 mm, and even more preferably 0.20 mm to 0.50 mm.

The rupturable plate has a circumferential edge fixing portion (an annular portion including the circumference of the circular rupturable plate) which is fixed to a structural member (either one of the bottle and the ignition device unit housing) of the inflator, and a circular non-fixing portion other than the circumferential edge fixing portion.

The rupturable plate has a fragile portion formed by grooves only in the circular non-fixing portion on the first surface facing the bottle.

The fragile portion is formed by three or more grooves extending from the circumference of the circular non-fixing portion on the first surface or from positions in the vicinity thereof, as a start point, toward the center such that each of the end points of the grooves does not reach the center of the circular non-fixing portion. The positions in the vicinity of the circumference, as referred to herein, mean the positions that may not be in contact with the circumference of the circular non-fixing portion (a boundary between the circumferential edge fixing portion and the circular non-fixing portion), for example, the positions at a distance of about 1 mm to 2 mm from the circumference.

The number of grooves formed equidistantly in the circumferential direction is three or more, preferably three to eight, more preferably four to eight.

All of the grooves have the same length, but there may be a deviation of about several percent from the average value of the lengths of all of the grooves taken as a reference.

When the rupturable plate is curved by receiving the load of the pressurized gas filled in the bottle, since the fragile portion (the grooves) is not formed in the central portion where the load concentrates most, the pressure resistance is increased. Furthermore, when an external load is applied in a concentrated manner on the back surface in the portion radially inside the end points of the fragile portion (the grooves) of the rupturable plate, the rupturable plate is easily fractured.

The grooves forming the fragile portion may be formed continuously or discontinuously (for example, as dot lines) in the radial direction.

The lateral cross-sectional shape of the grooves forming the fragile portion can be V-shaped, U-shaped, semicircular, or trapezoidal.

The width of the grooves is not particularly limited and can be, for example, about the same as the depth.

At the time of activation, the rupturable plate is fractured by a combination of the ignition device and the rod provided at the partition wall and serving as a fracturing device. The partition wall and the rod may be integrated or separate members to be combined.

An electric igniter, a combination of an electric igniter and a transfer charge, a combination of an electric igniter and a gas generating agent, and the like can be used as the ignition device.

Any rod capable of applying a pressure to the rupturable plate can be used.

A cross-sectional shape (a cross-sectional shape of the tip of the rod that collides with the rupturable plate) and size of the rod are such that, at the time of activation, the rod comes in contact with at least all of the end points of the grooves (the fragile portion) formed in the rupturable plate.

A cross-sectional shape (a cross-sectional shape of the tip of the rod that collides with the rupturable plate) of the rod can be circular, polygonal, or of other shape (for example, a cross-like shape).

When the cross-sectional shape (the cross-sectional shape of the tip of the rod that collides with the rupturable plate) of the rod is circular, the maximum cross-sectional area (a2) of the tip of the rod in the radial direction and the area (a1) of the circle (the circle where the grooves are not formed) formed by connecting the end points of three or more grooves forming the fragile portion satisfy the relationship a2≥a1. Further, the a2/a1 ratio is preferably within a range of 1 to 1.2.

When a1 and a2 satisfy this relationship, the rod penetrating through the rupturable plate and the end points of the grooves (the fragile portion) inevitably come in contact with each other. Therefore, the rupturable plate is easily fractured at the time of activation.

When the cross-sectional shape (the cross-sectional shape of the tip of the rod that collides with the rupturable plate) of the rod is polygonal, a polygon corresponding to the number of grooves (the number of end points) is formed.

For example, where a fragile portion is formed by three or four grooves (with three or four end points), the cross section (the cross section of the tip of the rod that collides with the rupturable plate) of the rod is made triangular or quadrangular so that three or four vertices of the triangle or quadrangle comes in contact with three or four end points in the fragile portion.

Further, for example, where a fragile portion is formed by four grooves (with four end points), the cross section (the cross section of the tip of the rod that collides with the rupturable plate) of the rod can be in a cross-like shape to come in contact with the four end points of the grooves, and where a fragile portion is formed by three grooves (with three end points) or six grooves (with six end points), the cross section of the rod can be in a shape enabling the rod to come in contact with three or six end points of the grooves, respectively, in the same manner as in the case of the cross-like shape.

A rod with a sharp tip can be used to apply a pressure to the central portion of the rupturable plate, so that the rupturable plate ruptures like petals. Alternatively, a rod with a flat or spherical tip can be used to apply a pressure to the entire fragile portion of the rupturable plate or part thereof, so that the rupturable plate ruptures like petals.

Preferably, the rod has a sharp portion at the tip.

A rod having a sharp portion at the tip can be a rod with a spherical recess at the tip surface, a rod with an arrowhead tip, or a rod with an obliquely cut tip.

At the time of activation of the inflator, when the partition wall moves axially on receiving the pressure caused by the activation of the ignition device and the rod collides with the rupturable plate, the rupturable plate is cut at the fragile portion and bent at the boundary of the fixed portion and non-fixing portion. As a result, the rupturable plate is ruptured like petals to open a discharge path for the pressurized gas. In this case, the rupturing is advanced from the vicinity of each of the end points toward each of the start points as a result of the rod coming in contact with all of the end points in the fragile portion. The term "contact" is inclusive not only of the case in which the outer edge of the rod coincides with the end points, but also of the case in which the outer edge of the rod is at a slight distance from the end points toward the start points.

When there are three, four, or six grooves, the ruptutable plate is ruptured as three, four, or six triangular petals, respectively.

When the inflator uses a pressurized gas as a gas source, the interior of a bottle-like housing (serving as a pressurized gas-filled space) is filled with a gas such as argon or helium under a high pressure, and the gas outlet is closed with the ruptutable plate.

The inflator of the present invention uses a ruptutable plate having a specific fragile portion as the ruptutable plate.

The thickness of the ruptutable plate used in the inflator is preferably 0.20 mm to 2.0 mm, more preferably 0.20 mm to 1.0 mm, and even more preferably 0.20 mm to 0.50 mm.

The ruptutable plate has a circumferential edge fixing portion (an annular portion including the circumference of the circular ruptutable plate) which is fixed to a structural member (either one of the bottle and the ignition device unit housing) of the inflator, and a circular non-fixing portion other than the circumferential edge fixing portion.

The ruptutable plate has a fragile portion including first fragile portions and second fragile portions inside a polygon formed only in the circular non-fixing portion on a first surface side facing the bottle.

The polygon may be a regular or irregular polygon, and the presence of the fragile portion enables rupturing in a triangular (a regular triangular or an isosceles triangular) petal-like shape at the time of activation.

The first fragile portions are formed by grooves forming the circumference of the polygon.

The second fragile portions are formed by grooves in which the start point corresponds to all of the vertices of the polygon and each of the end points does not reach the center of the polygon. Where the polygon is not regular, the center thereof is an area center.

All of the second fragile portions have the same length as one another, but there may be a deviation of about several percent from the average value of the lengths of all of the second fragile portions taken as a reference.

Thus, inside the polygon, the first fragile portions and the second fragile portions form a plurality of substantially triangular shapes in each of which the first fragile portion is a base and the second fragile portions are the remaining two sides. The "substantially triangular shape", as referred to herein, indicates that at least the second fragile portions serving as two sides are not in contact with each other at the central portion of the ruptutable plate and, therefore, a perfect triangular shape is not formed.

Where the polygon formed by these fragile portions is a regular polygon, in mathematics, a regular polygon is "a polygon in which all sides have the same length and all angles are equal in measure", but the lengths of the sides and the angles may differ by several percent, provided that normal rupture of the ruptutable plate is not affected, and there may be a certain difference between the angles or dimensions as long as the advantageous effects of the present invention are obtained.

The first fragile portions and the second fragile portions are formed by grooves, and the thickness of the ruptutable plate is reduced by the depth of the grooves in the portions where the first fragile portions and the second fragile portions are formed.

The depth ($h_1$) of the first fragile portion and the depth ($h_2$) of the second fragile portion satisfy the relationship $h_1 < h_2$. Therefore, when the same load is applied, the second fragile portions are more likely to rupture.

A ratio ($h_1/T$) of the depth ($h_1$) of the first fragile portion formed by the groove to a thickness (T) of a portion in the ruptutable plate devoid of the first fragile portions is in a range of 0.05 to 0.50, preferably 0.10 to 0.40, and even more preferably 0.10 to 0.30.

A ratio ($h_2/T$) of the depth ($h_2$) of the second fragile portion formed by the groove to a thickness (T) of a portion in the ruptutable plate devoid of the second fragile portions is in a range of 0.20 to 0.60, preferably 0.30 to 0.50, and even more preferably 0.35 to 0.50.

The petal-like rupturing of the ruptutable plate is facilitated by adjusting the ratio of the thicknesses of the ruptutable plate in the first fragile portions and the second fragile portions (the ratio of the depths of the respective fragile portions).

The width of the grooves is not particularly limited and may be, for example, about the same as the depth.

The grooves forming the first fragile portions and the second fragile portions may be formed continuously or discontinuously (for example, as dot lines). The second fragile portions may be continuous grooves and the first fragile portions may be discontinuous grooves.

The lateral cross-sectional shape of the grooves forming the first fragile portions and the second fragile portions can be V-shaped, U-shaped, semicircular, trapezoidal, etc. The first fragile portions and the second fragile portions may have different cross-sectional shapes, such that the first fragile portions are V-shaped and the second fragile portions are rectangular.

The depth and width of the grooves forming the first fragile portions and the second fragile portions may be adjusted to enable the rupturing while maintaining the strength necessary for the rupturable plate.

At the time of activation, the rupturable plate is fractured by a combination of the ignition device and the rod provided at the partition wall and serving as a fracturing device. The partition wall and the rod may be integrated or separate members to be combined.

An electric igniter, a combination of an electric igniter and a transfer charge, a combination of an electric igniter and a gas generating agent, and the like can be used as the ignition device.

Any rod capable of applying a pressure to the rupturable plate can be used.

The cross-sectional shape (the cross-sectional shape of the tip of the rod that collides with the rupturable plate) and size of the rod are such that at the time of activation the rod comes in contact with at least all of the end points of the second fragile portions formed in the rupturable plate, and may have the same cross-sectional shape (the cross-sectional shape of the tip of the rod that collides with the rupturable plate) and size as those of the above-described rod.

Preferably, the rod has a sharp portion at a tip thereof.

For example, a rod with a sharp tip can be used to apply a pressure to the central portion of the rupturable plate, so that the rupturable plate ruptures like petals. Alternatively, a rod with a flat or spherical tip can be used to apply a pressure to the entire fragile portion of the rupturable plate, so that the rupturable plate ruptures like petals.

A rod having a sharp portion at the tip can be a rod with a spherical recess at the tip surface, a rod with an arrowhead tip, or a rod with an obliquely cut tip.

Further, it is preferred that the cross-sectional shape of the rod is circular, and that an a2/a1 ratio of the maximum cross-sectional area (a2) of the rod in the radial direction to the area (a1) of the circle formed by connecting the end points of the grooves of the second fragile portions is in a range of 1 to 1.2.

At the time of activation of the inflator, when the partition wall moves axially on receiving the pressure caused by the activation of the ignition device and the rod collides with the rupturable plate, the rupturable plate is cut at the second fragile portions and bent at the first fragile portions. As a result, the rupturable plate is ruptured like petals to open a discharge path for the pressurized gas. In this case, the rupturing is advanced from the vicinity of each of the end points toward each of the start points as a result of the rod coming in contact with all of the end points of the second fragile portions.

When the fragile portion as a whole has a triangular, quadrangular, or hexagonal shape, the rupturable plate is ruptured as three, four, or six triangular petals, respectively.

Description of Embodiments

Figure 1:
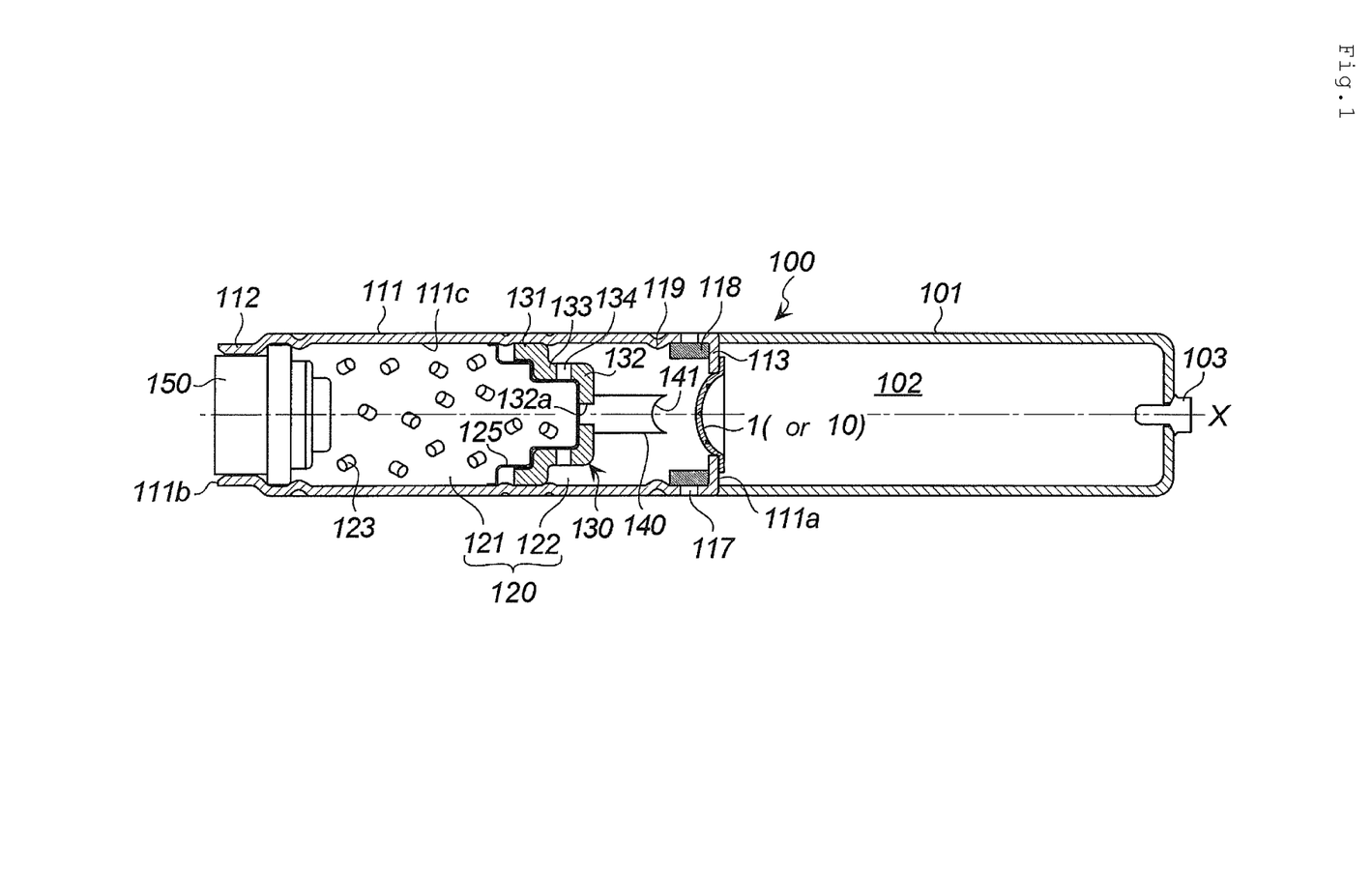
FIG. 1 shows a sectional view in the axis X direction of the inflator of the present invention.

<Inflator 100 Depicted in FIG. 1>

Figure 2:
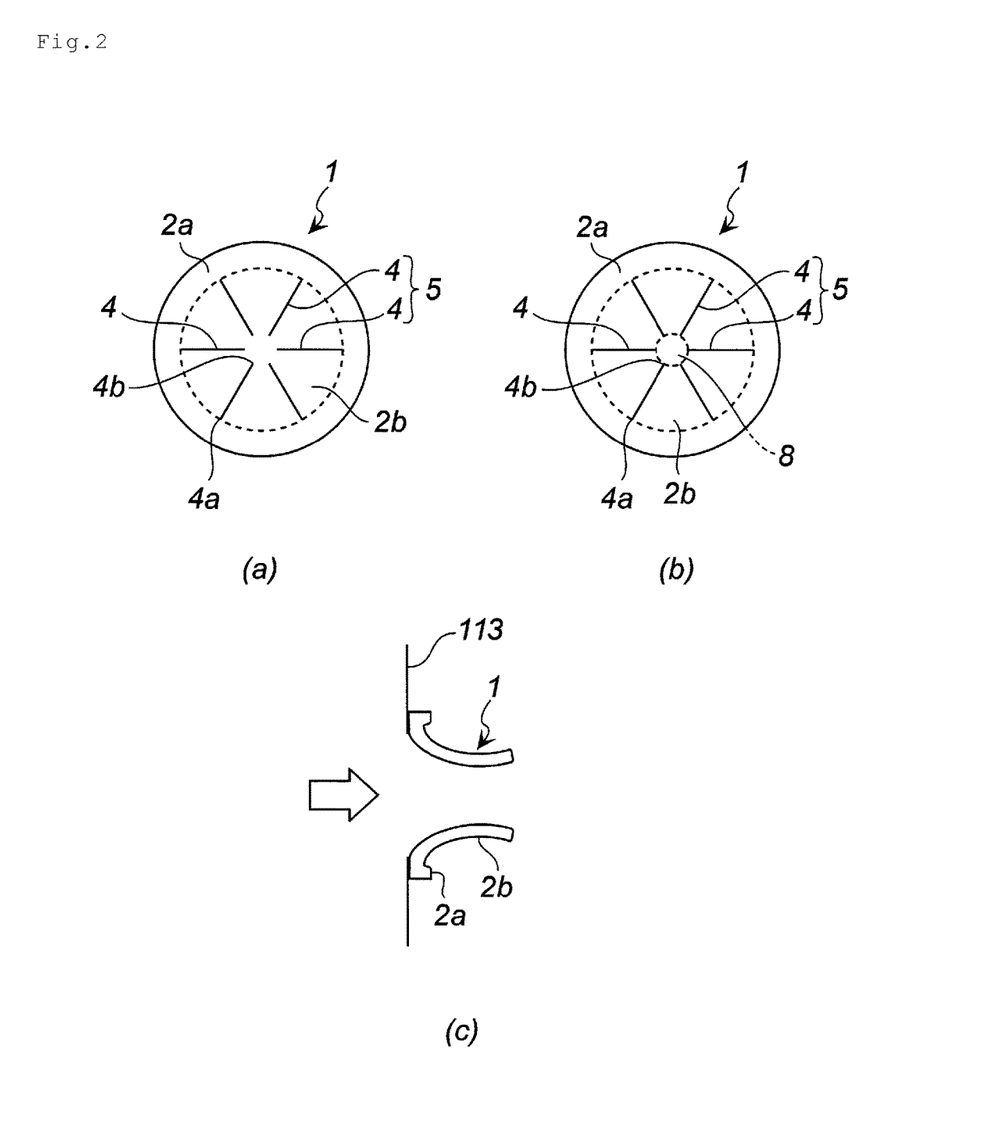
Figure 3:
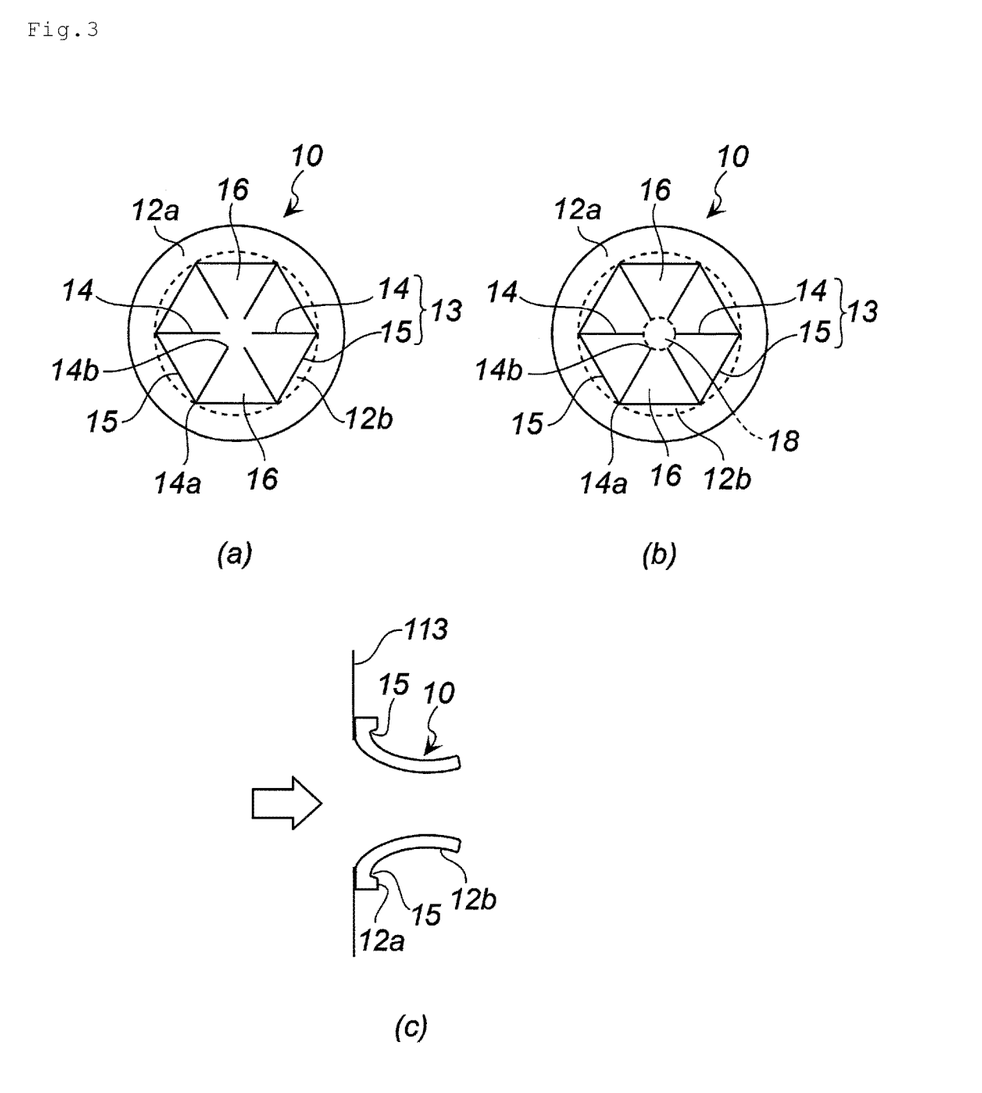

An inflator 100 depicted in FIG. 1 will be explained herein. In the inflator 100, a rupturable plate 1 depicted in (a) in FIG. 2 or a rupturable plate 10 depicted in (a) in FIG. 3 can be used.

In the inflator 100, an inflator housing is formed of a bottle 101 and a cylindrical ignition device unit housing 111.

The interior of the bottle 101 is a pressurized gas chamber (a pressurized gas-filled space) 102 which is filled with a gas such as argon or helium under a high pressure. The reference numeral 103 denotes a pin for closing a hole through which the gas is filled. The pin 103 is welded to the bottle 101 after the gas is filled.

An opening at a second end 111b (on the side of the bottle 101) of the cylindrical ignition device unit housing 111 is fixed by welding to an opening of the bottle 101.

An electric igniter 150 is fitted into the opening at a first end 111a, which is opposite to the second end 111b of the cylindrical ignition device unit housing 111. The electric igniter 150 is fixed by deforming a circumferential wall portion 112 of the first end 111a to reduce the outer diameter thereof.

An annular flat portion 113 formed radially inward is arranged at the opening of the second end 111b of the cylindrical ignition device unit housing 111, and the rupturable plate 1 (or the rupturable plate 10) is fixed by welding to the annular flat portion 113.

The opening of the pressurized gas chamber (the pressurized gas-filled space) 102 is closed by the rupturable plate 1 (or the rupturable plate 10).

The rupturable plate 1 will be explained herein with reference to (a) to (c) in FIG. 2.

The rupturable plate 1 is a disk with a thickness (T) of 0.30 mm.

The rupturable plate 1 is formed of a stainless steel, a nickel-alloy steel, a low-carbon steel, and the like.

The rupturable plate 1 has a circumferential edge fixing portion 2a that is fixed to the annular flat portion 113, and a circular non-fixing portion 2b other than the circumferential edge fixing portion 2a.

The circular non-fixing portion 2b on one surface of the rupturable plate 1 has a fragile portion 5 formed of six grooves (with a depth of 0.12 mm) 4 extending from a circumference of the circular non-fixing portion 2b as a start point 4a to an end point 4b but not reaching the center of the circular non-fixing portion 2b.

The six grooves 4 forming the fragile portion 5 have a V-shaped cross-section in the lateral direction and are arranged radially and equidistantly in the circumferential direction within the circular non-fixing portion 2b.

The six end points 4b do not reach a portion including the center of the circular non-fixing portion 2b.

The length from the six start points 4a to the six end points 4b is the same for each groove 4. As depicted in (b) in FIG. 2, the grooves 4 (the fragile portion 5) are not formed inside a circle 8 (including the center of the circular non-fixing portion 2b) surrounded by a circumference represented by a broken line connecting the six end points 4b.

The broken line denoting the circle 8 in (b) in FIG. 2 serves to explain the range in which the grooves 4 (the fragile portion 5) are not formed and not to denote the fragile portion. The broken line connecting the start points 4a denotes the boundary between the circumferential edge fixing portion 2a and the circular non-fixing portion 2b.

A ratio (h2/T=0.12/0.30) of the depth (h2) of the fragile portion 5 (the groove 4) to the thickness (t2=T) of the rupturable plate 1 at the fragile portion 5 is 0.40.

In the rupturable plate 1, the fragile portion 5 (the grooves 4) do not intersect (have no point of intersection) in the central portion (in the range surrounded by the circle 8) and a load is not concentrated therein even when the rupturable plate is curved. Therefore, a strength (a pressure resistance) of the entire rupturable plate is maintained at a high level.

As depicted in (c) in FIG. 2, the rupturable plate 1 is fixed to a structural member (the annular flat portion 113 depicted in FIG. 1) of the inflator such that the surface provided with the fragile portion 5 faces the pressurized gas chamber 102. In this case, the rupturable plate is curved toward the ignition device unit housing 111 by a filled gas pressure in the pressurized gas chamber 102.

At the time of activation, a pressure (a pressure or load which is generated by the activation of the ignition device and acts from the direction shown by the arrow) is received on the back surface with respect to the surface provided with the fragile portion 5, the rupturable plate is bent at the boundary portion of the circumferential edge fixing portion 2a and the circular non-fixing portion 2b and fractured at the fragile portion 5 so as to be ruptured into a petaloid shape.

The rupturable plate 10 will be explained herein with reference to (a) to (c) in FIG. 3.

The rupturable plate 10 is a disk with a thickness (T) of 0.30 mm.

The rupturable plate 10 is formed of a stainless steel, a nickel-alloy steel, a low-carbon steel, and the like.

The rupturable plate 10 has a circumferential edge fixing portion 12a that is fixed to the annular flat portion 113, and a circular non-fixing portion 12b other than the circumferential edge fixing portion 12a.

A regular hexagonal fragile portion 13 is formed in the circular non-fixing portion 12b on the first surface (on the side of the bottle 101) of the rupturable plate 10.

The fragile portion 13 includes first fragile portions 15 formed by grooves (in a depth h1=0.06 mm) forming a circumference of the regular hexagon, and second fragile portions 14 formed by six grooves (in a depth h2=0.12 mm) extending from all vertices of the regular hexagon in the direction of the center of the regular hexagon.

The second fragile portions 14 and the first fragile portions 15 are grooves with a V-shaped cross section in the lateral direction.

Each second fragile portion 14 is formed from a start point 14a, which is the vertex of the regular hexagon, and extends toward the center of the regular hexagon (the circular non-fixing portion 12b) to an end point 14b. The start point 14a is on the circumference of the circular non-fixing portion 12b (the boundary between the circumferential edge fixing portion 12a and the circular non-fixing portion 12b), but is not necessarily in contact with the circumference of the circular non-fixing portion 12b and may be at a position close to the circumference (for example, at a position at a distance of about 1 mm to 2 mm from the circumference).

The six end points 14b do not reach a portion including the center of the regular hexagon.

Each length of the six second fragile portions 14 from the start point 14a to the end point 14b is the same for each second fragile portion 14. Therefore, as depicted in (b) in FIG. 3, the second fragile portions 14 are not formed inside a circle 18 (including the center of the regular hexagon) surrounded by a circumference represented by a broken line connecting the six end points 14b. The broken line denoting the circle 18 in (b) in FIG. 3 serves to explain the range in which the second fragile portions 14 are not formed and not to denote the fragile portions. The broken line connecting the start points 14a denotes the boundary between the circumferential edge fixing portion 12a and the circular non-fixing portion 12b.

In (a) in FIG. 3, six substantially regular triangles 16 are formed. In each triangle, the first fragile portion 15 serves as a base, and the second fragile portions 14 serve as two remaining sides which are not closed on the center side of the regular hexagon.

A ratio (h1/T=0.06/0.30) of the depth (h1) of the first fragile portion 15 to the thickness (t1=T) of the rupturable plate 10 at the first fragile portion 15 is 0.20.

A ratio (h2/T=0.12/0.30) of the depth (h2) of the second fragile portion 14 to the thickness (t2=T) of the rupturable plate 10 at the second fragile portion 14 is 0.40.

In the rupturable plate 10, the fragile portion is not formed in the central portion (in the range surrounded by the circle 18), in other words, there is no point of intersection of the second fragile portions 14. For this reason, a load is not concentrated therein even when the rupturable plate is curved. Therefore, a strength (a pressure resistance) of the entire rupturable plate is maintained at a high level.

As depicted in (c) in FIG. 3, the rupturable plate 10 is fixed to a structural member (the annular flat portion 113 depicted in FIG. 1) of the inflator such that the surface provided with the fragile portion 13 faces the pressurized gas chamber 102. In this case, the rupturable plate is curved toward the ignition device unit housing 111 by a filled gas pressure in the pressurized gas chamber 102. However, at the time of activation, a pressure (a pressure or load which is generated by the activation of the ignition device and acts from the direction shown by the arrow) is received on the back surface with respect to the surface provided with the fragile portion 5, and the rupturable plate is bent at the first fragile portions 15 and fractured at the second fragile portions 14 so as to be ruptured into a petaloid shape.

The interior of the cylindrical ignition device unit housing 111 which is closed at both ends is an ignition device chamber 120.

The interior of the ignition device chamber 120 is separated by a convex partition wall 130 into a combustion chamber 121 and a diffuser chamber 122.

The shape of the convex partition wall 130 is not particularly limited, provided that it ensures separation into the combustion chamber 121 and the diffuser chamber 122.

The convex partition wall 130 depicted in FIG. 1 has an outer circumferential wall 131 which abuts against an inner circumferential surface 111c of the ignition device unit housing 111, an annular support portion 132 which has a fixing hole 132a for supporting and fixing a rod 140, and an inner circumferential wall 133 which is provided with a plurality of through holes 134 and connects the outer circumferential wall 131 and the annular support portion 132.

The convex partition wall 130 is fixed by press-fitting the outer circumferential wall 131 into the ignition device unit housing 111.

The interior of the combustion chamber 121 is charged with a predetermined amount of a molded article of a gas generating agent 123 in contact with an igniter 150.

The through holes 134 of the convex partition wall 130 are closed from the inside with a cup-shaped closing member 125, which is disposed inside the combustion chamber 121, to prevent moisture penetration.

The cup-shaped closing member 125 has the same shape as the inner shape of the convex partition wall 130 and is fitted into the convex partition wall 130 from the combustion chamber 121 to close the through holes 134.

Further, part of the cup-shaped closing member 125 is attached to the inner circumferential surface 111c of the ignition device unit housing 111, for example, by coating a known sealing agent, to ensure the air tightness of the combustion chamber 121.

The diffuser chamber 122 has a plurality of gas discharge ports 117 formed in the ignition device unit housing 111, close to the annular flat portion 113.

An annular filter 118 is fixed on the inner side of the plurality of gas discharge ports 117 in a state of being axially held between the annular flat portion 113 and a protrusion 119.

The diffuser chamber 122 is communicated with the external atmosphere through the gas discharge ports 117 and the annular filter 118.

The rod 140 is positioned inside the diffuser chamber 122. In the rupturable plate 1 (or the rupturable plate 10), the circumferential edge fixing portion 2a (or the circumferential edge fixing portion 12a) is fixed by welding to the annular flat portion 113 from the pressurized gas chamber 102 side so that the fragile portion 5 (the fragile portion 13) faces the pressurized gas chamber 102.

The rupturable plate 1 (or the rupturable plate 10) and the tip of the rod 140 are close to each other, but not in contact.

The center of the rupturable plate 1 (or the rupturable plate 10), the center axis of the rod 140, and the center axis X of the inflator 100 coincide.

Figure 4:
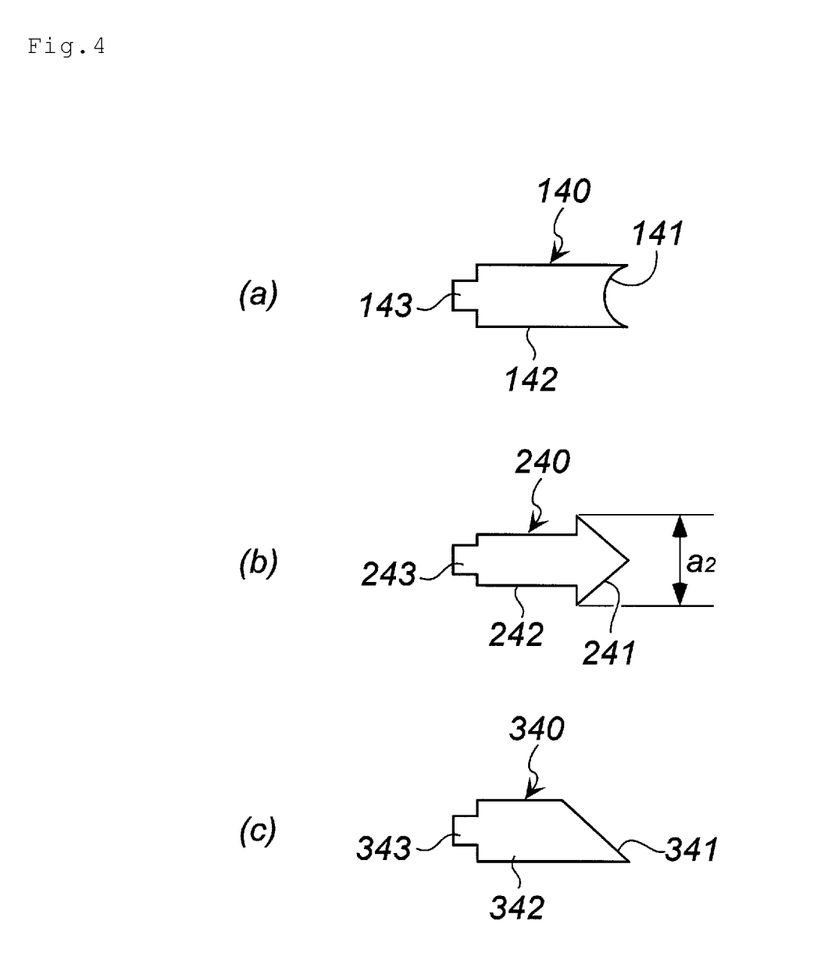

The rod 140 depicted in FIG. 1 is illustrated by (a) in FIG. 4. The rod has a sharp tip 141, a shaft 142 and a protruding portion 143, and is fixed by inserting the protruding portion 143 into a fixing hole 132a of the convex partition wall 130.

The end surface of the shaft 142 at the tip 141 of the rod 140 has a spherical receding shape, and the circumferential edge of the end surface is a sharp portion protruding toward the rupturable plate 1.

The rod 140 is not limited to that depicted in (a) in FIG. 4 and, in addition to the shapes depicted in (b) and (c) of FIG. 4, may have a flat or convex spherical tip, rather than a sharpened tip.

A rod 240 depicted in (b) in FIG. 4 has an arrowhead tip 241, a shaft 242 and a protruding portion 243, and when the rod is mounted on the inflator 100 depicted in FIG. 1, the rod is fixed by fitting the protruding portion 243 into the fixing hole 132a of the convex partition wall 130.

A rod 340 depicted in (c) in FIG. 4 has a sharp tip 341 obtained by obliquely cutting the distal end portion of the shaft 342, a shaft 342 and a protruding portion 343. When mounted on the inflator 100 depicted in FIG. 1, the rod is fixed by inserting the protruding portion 343 into the fixing hole 132a of the convex partition wall 130.

The rods 140, 240, and 340 depicted in (a) to (c) in FIG. 4 may have a hollow structure to reduce weight, provided that the necessary strength is maintained. The rods 140 and 340 depicted in (a) and (c) in FIG. 4 may have a tubular structure.

The rod 140 depicted in FIG. 4 has a circular cross-sectional shape, and the maximum cross-sectional area (a2) in the radial direction of the rod 140 and the area (a1) of the circle 8 depicted in (b) in FIG. 2 (or the circle 18 depicted in (b) in FIG. 3) (which is the circle provided with no fragile portion) satisfy the relationship a2/a1=1.

Where a1 and a2 satisfy this relationship, when the rod 140 collides with the rupturable plate 10, the rod 140 collides at least with the end points 4b of the grooves 4 (the end points 14b of the second fragile portions 14). Therefore, rupture is generated from the end point 4b toward the start point 4a and the fracture of the rupturable plate 1 (the rupturable plate 10) is facilitated.

In the rods 140 and 340 depicted in (a) and (c) in FIG. 4, a2 is the radial sectional area of the shafts 142 and 342, and in the rod 240 depicted in (b) in FIG. 4, a2 is the cross-sectional area of the maximum-diameter portion of the arrowhead tip 241.

The operation performed when the inflator 100 depicted in FIG. 1 is used in an airbag apparatus will be explained hereinbelow. The rupturable plate 10 depicted in FIG. 3 is used.

In the inflator 100 depicted in FIG. 1, the combination of the igniter 150, the molded article of the gas generating agent 123, and the rod 140 functions as a device for fracturing the rupturable plate 10 depicted in (a) in FIG. 3.

The rupturable plate 1 depicted in (a) in FIG. 2 can be used instead of the rupturable plate 10 depicted in (a) in FIG. 3, and the rod 240 depicted in (b) in FIG. 4 or the rod 340 depicted in (c) in FIG. 4 can be used instead of the rod 140 depicted in FIG. 1 and (a) in FIG. 4.

Before the activation, the rupturable plate 10 has received a high pressure from the pressurized gas chamber 102, and stays curved as depicted in FIG. 1. However, since the second fragile portion 14 is not formed in the central portion (surrounded by the circle 18) of the rupturable plate 10 where the deformation amount is at a maximum, as depicted in (b) in FIG. 3, the pressure resistance of the rupturable plate 10 is maintained at a high level.

At the time of activation, the igniter 150 is activated, the molded article of the gas generating agent 123 is ignited and burnt, and a combustion gas is generated inside the combustion chamber 121.

The pressure inside the combustion chamber 121 is thereby increased. As a result, the cup-shaped closing member 125 is ruptured, the through holes 134 are opened, and part of the combustion gas flows into the diffuser chamber 122.

The combustion gas flowing into the diffuser chamber 122 is discharged from the gas discharge ports 117 after passing through the annular filter 118 and then inflates an airbag.

Further, where the pressure inside the combustion chamber 121 is increased at the same time by the remaining combustion gas, the convex partition wall 130 moves toward the bottle 101.

Before the activation, the convex partition wall 130 is fixed by a shallow protrusion formed in the inner circumferential surface 111c of the ignition device unit housing 111, but the outer circumferential wall 131 moves over the protrusion due to the pressure.

The rod 140 also moves in the axial direction, and the tip 141 collides with the rupturable plate 10. In this case, the rod collides with all of the end points of the second fragile portions of the fragile portion 13. Since the rod 140 has a circular cross-sectional shape, the maximum sectional area (a2) in the radial direction of the rod 140 and the area (a1) of the circle 18 including the center of the regular hexagon (the circular non-fixing portion 12b where the second fragile portion 14 of the rupturable plate 10 is not formed satisfy the relationship a2/a1=1.

Therefore, the rod 140 collides with at least the end points 14b of the second fragile portions 14. As a result, the second fragile portions 14 are easily ruptured from each of the end points 14b toward each of the start points 14a and the fracture of the rupturable plate 10 is facilitated.

Further, when the rod 140 collides with the rupturable plate 10, since the depth (h1) of the groove of the first fragile portion 15 and the depth (h2) of the groove of the second fragile portion 14 satisfy the relationship h1<h2, the six second fragile portions 14 of the rupturable plate 10 are easily ruptured, but the six first fragile portions 15 corresponding to the bases of the regular triangles 16 are bent rather than ruptured. Therefore, the rupturable plate 10 ruptures like triangular petals and opens towards the pressurized gas chamber 102 (see (c) in FIG. 3). The first fragile portions 15 are formed in the surface in a side to which the rupturable plate 10 ruptures to facilitate the rupture of the rupturable plate 10.

Therefore, the pressurized gas chamber 102 and the diffuser chamber 122 are communicated with each other, and the pressurized gas passes together with the combustion gas through the annular filter 118 and then is discharged from the gas discharge ports 117 to inflate the airbag.

When the rupturable plate 10 depicted in (a) in FIG. 3 is used as the rupturable plate of the inflator 100, the first fragile portions 15 are easily bent and the second fragile portions 14 are easily ruptured. As a result, the rupturable plate 10 is easily opened. Further, no fragments of the rupturable plate 10 are produced, and a load required to rupture the rupturable plate 10 is reduced.

Therefore, an amount of the molded article of the gas generating agent 123 charged in the ignition device chamber 120 and an output of the igniter 150 are reduced and the inflator 100 is reduced in weight and size as a whole.

The annular filter 118 captures combustion residues contained in the combustion gas generated from the molded article of the gas generating agent 123 and cools the combustion gas. Therefore, the filter is not needed in the inflator which uses the rupturable plate of the present invention and does not use a molded article of a gas generating agent, or in an inflator in which amounts of residues and heat generated from a molded article of a gas generating agent are small.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An inflator, comprising:
an ignition device chamber accommodating therein an igniter and having a gas discharge port;
a pressurized gas chamber filled with a pressurized gas inside a bottle;
a rupturable plate closing between the ignition device chamber and the pressurized gas chamber;
a partition wall provided with a rod serving as a fracturing device for the rupturable plate and the partition wall axially separating an interior of an ignition device unit housing, corresponding to the ignition device chamber, into two chambers;
a combustion chamber provided on the side of a first end of the ignition device unit housing and provided with an electric igniter mounted at an opening of the first end; and
a diffuser chamber having the gas discharge port and provided on the side of a second end, which is an opposite end to the first end of the ignition device unit housing,
the rupturable plate being circular and having,
a circumferential edge fixing portion that is fixed to either one of the bottle and the ignition device unit housing,
a circular non-fixing portion on an inner portion other than the circumferential edge fixing portion,
a fragile portion formed by not less than three grooves provided on a first surface facing the bottle, the grooves extending from a circumference of the circular non-fixing portion or from positions in the vicinity thereof, as a start point, toward a center of the circular non-fixing portion such that each of end points of the grooves does not reach the center of the circular non-fixing portion,
no fragile portion formed on a second surface on the side of the ignition device unit housing, and
the rod provided at the partition wall and serving as the fracturing device, the rod being fixed to the partition wall and extending toward the rupturable plate, and the rod coming into contact with all of the end points in the fragile portion and rupturing the rupturable plate when the partition wall upon receipt of a gas pressure generated by activation of the ignition device moves in an axial direction and the rod collides with the rupturable plate.

2. The inflator according to claim 1, wherein
the cross-sectional shape of the rod is circular, and an $a2/a1$ ratio of the maximum cross-sectional area ($a2$) of the rod in the radial direction to the area ($a1$) of the circle formed by connecting the end points of the grooves forming the fragile portion is in a range of 1 to 1.2.

3. The inflator according to claim 1, wherein the rod has a sharp portion at a tip thereof.

4. An inflator, comprising:
an ignition device chamber accommodating therein an igniter and having a gas discharge port;
a pressurized gas chamber filled with a pressurized gas inside a bottle;
a rupturable plate closing between the ignition device chamber and the pressurized gas chamber;
a partition wall provided with a rod serving as a fracturing device for the rupturable plate and the partition wall axially separating an interior of an ignition device unit housing, corresponding to the ignition device chamber, into two chambers;
a combustion chamber provided on the side of a first end of the ignition device unit housing and provided with an electric igniter mounted at an opening of the first end; and
a diffuser chamber having the gas discharge port and provided on the side of a second end, which is an opposite end to the first end of the ignition device unit housing,
the rupturable plate being circular and having,
a circumferential edge fixing portion that is fixed to either one of the bottle and the ignition device unit housing,
a circular non-fixing portion on an inner portion other than the circumferential edge fixing portion,
a fragile portion formed in a polygon in the circular non-fixing portion on a first surface facing the bottle, the fragile portion including,
first fragile portions formed by grooves forming a perimeter of the polygon, and
second fragile portions formed by grooves that extend from all vertices of the polygon as a start point toward a center of the polygon such that each of end points of the grooves does not reach the center of the polygon, a plurality of substantially triangular shapes formed by the first fragile portions as a base and the second fragile portions as remaining two sides, a depth (h1) of the first fragile portion and a depth (h2) of the second fragile portion satisfying the relationship h1<h2, the second fragile portions having the same length as one other, and the rod coming into contact with all of the end points of the second fragile portions and rupturing the rupturable plate when the partition wall upon receipt of a gas pressure generated by activation of the ignition device moves in an axial direction and the rod collides with the rupturable plate.

5. The inflator according to claim 4, wherein a ratio (h1/T) of the depth (h1) of the first fragile portion formed by the groove to a thickness (T) of a portion in the rupturable plate devoid of the first fragile portions is in a range of 0.05 to 0.50, a ratio (h2/T) of the depth (h2) of the second fragile portion formed by the groove to a thickness (T) of a portion in the rupturable plate devoid of the second fragile portions is in a range of 0.20 to 0.60, and the relationship h1<h2 is satisfied.

6. The inflator according to claim 4, wherein the cross-sectional shape of the rod is circular, and an a2/a1 ratio of the maximum cross-sectional area (a2) of the rod in the radial direction to the area (a1) of the circle formed by connecting the end points of the grooves of the second fragile portions is in a range of 1 to 1.2.

7. The inflator according to claim 4, wherein the rod has a sharp portion at a tip thereof.

* * * * *